(12) United States Patent
Okita

(10) Patent No.: US 9,778,504 B2
(45) Date of Patent: Oct. 3, 2017

(54) LIQUID CRYSTAL DISPLAY PANEL

(71) Applicant: Japan Display Inc., Minato-ku (JP)

(72) Inventor: Mitsutaka Okita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/957,093

(22) Filed: Dec. 2, 2015

(65) Prior Publication Data

US 2016/0178962 A1    Jun. 23, 2016

(30) Foreign Application Priority Data

Dec. 19, 2014 (JP) ................. 2014-257751

(51) Int. Cl.
*G02F 1/1335* (2006.01)
*G02F 1/1333* (2006.01)

(52) U.S. Cl.
CPC .. *G02F 1/133514* (2013.01); *G02F 1/133345* (2013.01); *G02F 1/133371* (2013.01); *G02F 1/133512* (2013.01); *G02F 2201/40* (2013.01); *G02F 2201/52* (2013.01)

(58) Field of Classification Search
CPC ......... G02F 1/133514; G02F 1/133245; G02F 1/133512; G02F 1/133345; G02F 1/133371
See application file for complete search history.

(56) References Cited

U.S. PATENT DOCUMENTS

| 8,547,507 B2* | 10/2013 | Roh | ................. G02F 1/133514 349/106 |
|---|---|---|---|
| 2007/0126973 A1* | 6/2007 | Ikeda | ................. G02F 1/133514 349/155 |
| 2011/0291550 A1 | 12/2011 | Kim et al. | |

FOREIGN PATENT DOCUMENTS

JP    2011-249334    12/2011

* cited by examiner

*Primary Examiner* — Dung Nguyen
(74) *Attorney, Agent, or Firm* — Oblon, McClelland, Maier & Neustadt, L.L.P.

(57) ABSTRACT

According to one embodiment, a liquid crystal display panel includes a first substrate, a second substrate, a liquid crystal layer, a first color filter and a second color filter. The first substrate includes an organic insulating film, a first pixel electrode and a second pixel electrode. The organic insulating film includes a first projection portion located opposite to the boundary between the first color filter and the second color filter, extending along the boundary, and projecting toward the second substrate.

10 Claims, 11 Drawing Sheets

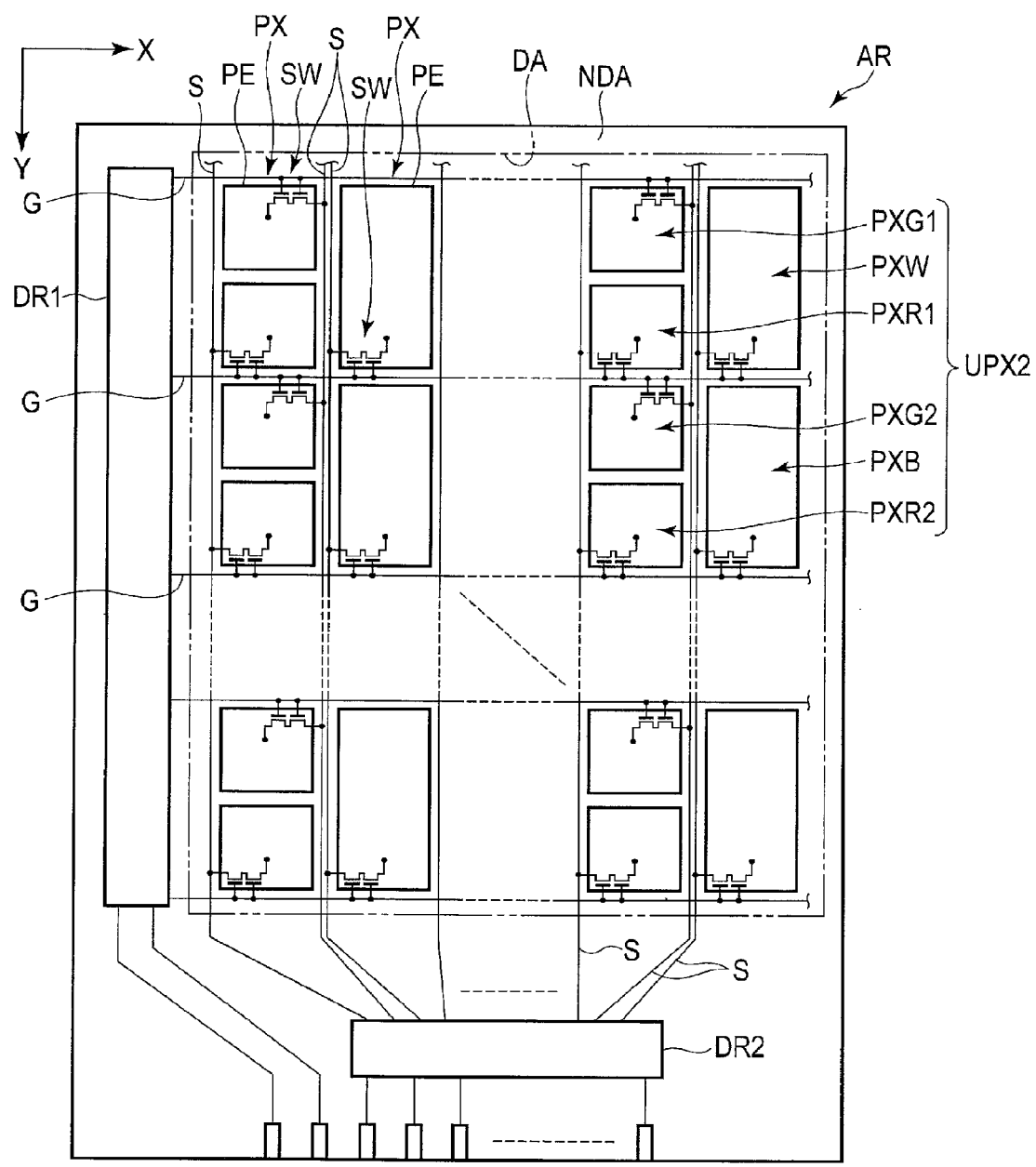
F I G. 4

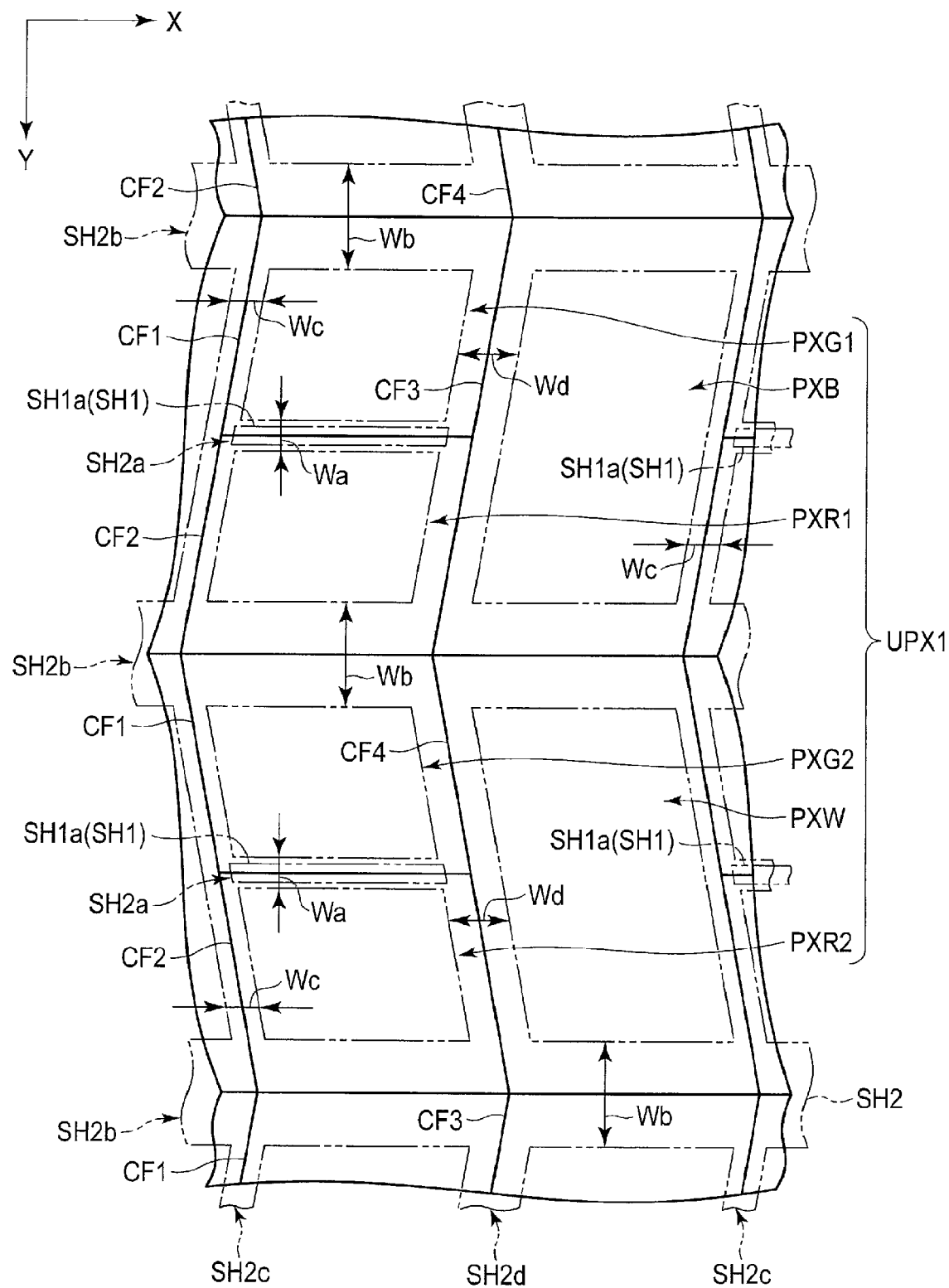
F I G. 6

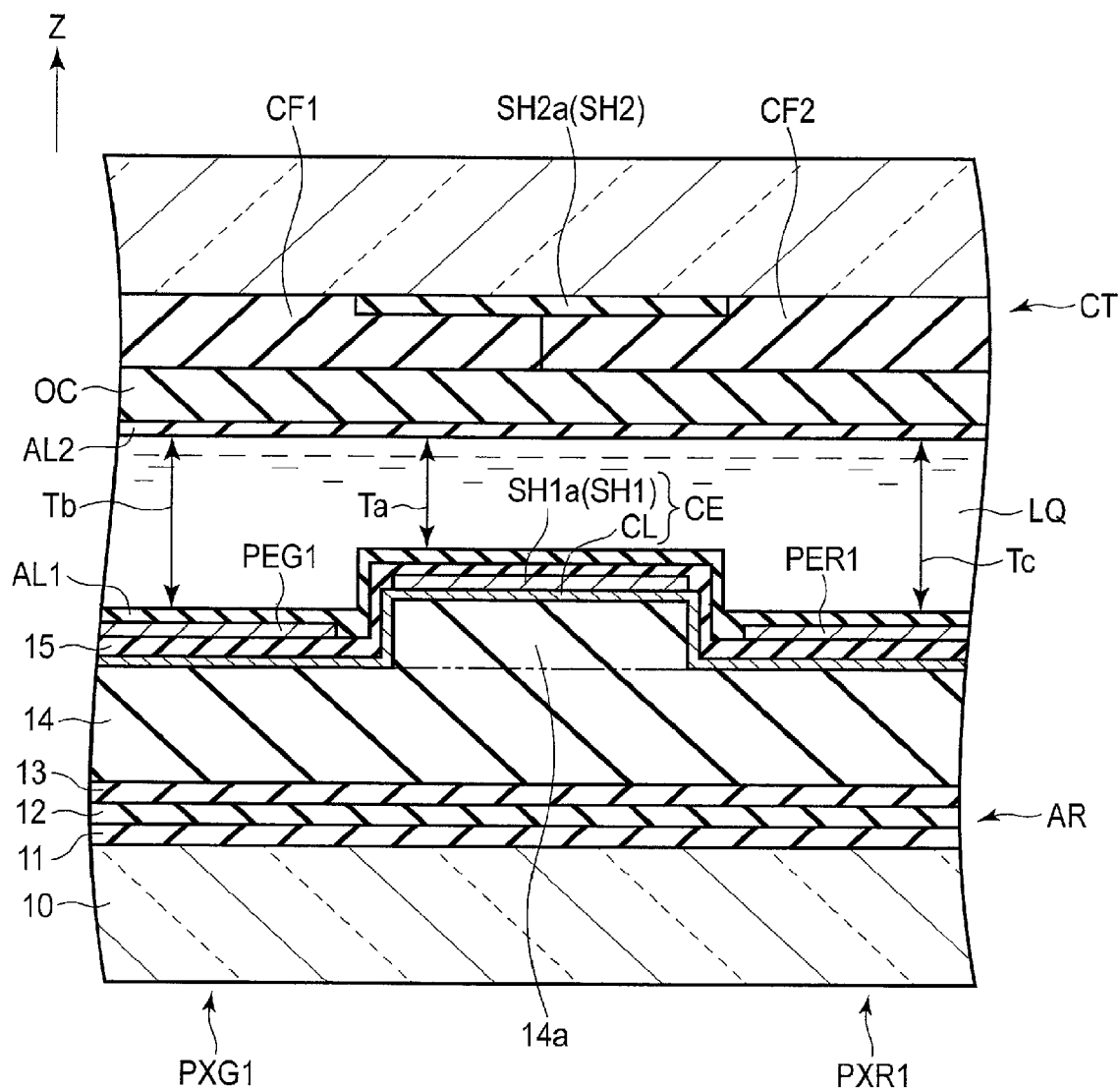
F I G. 7

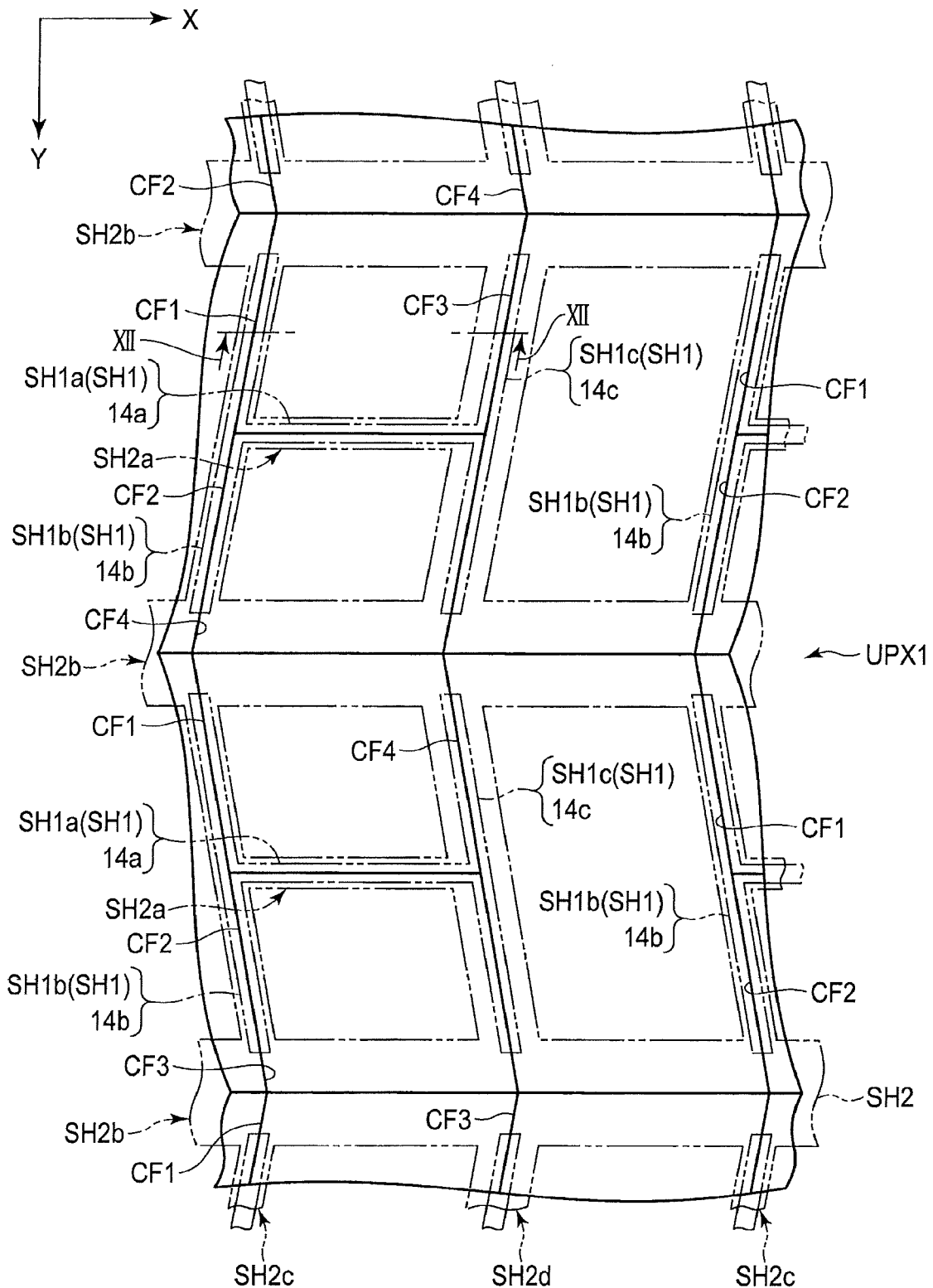
F I G. 8

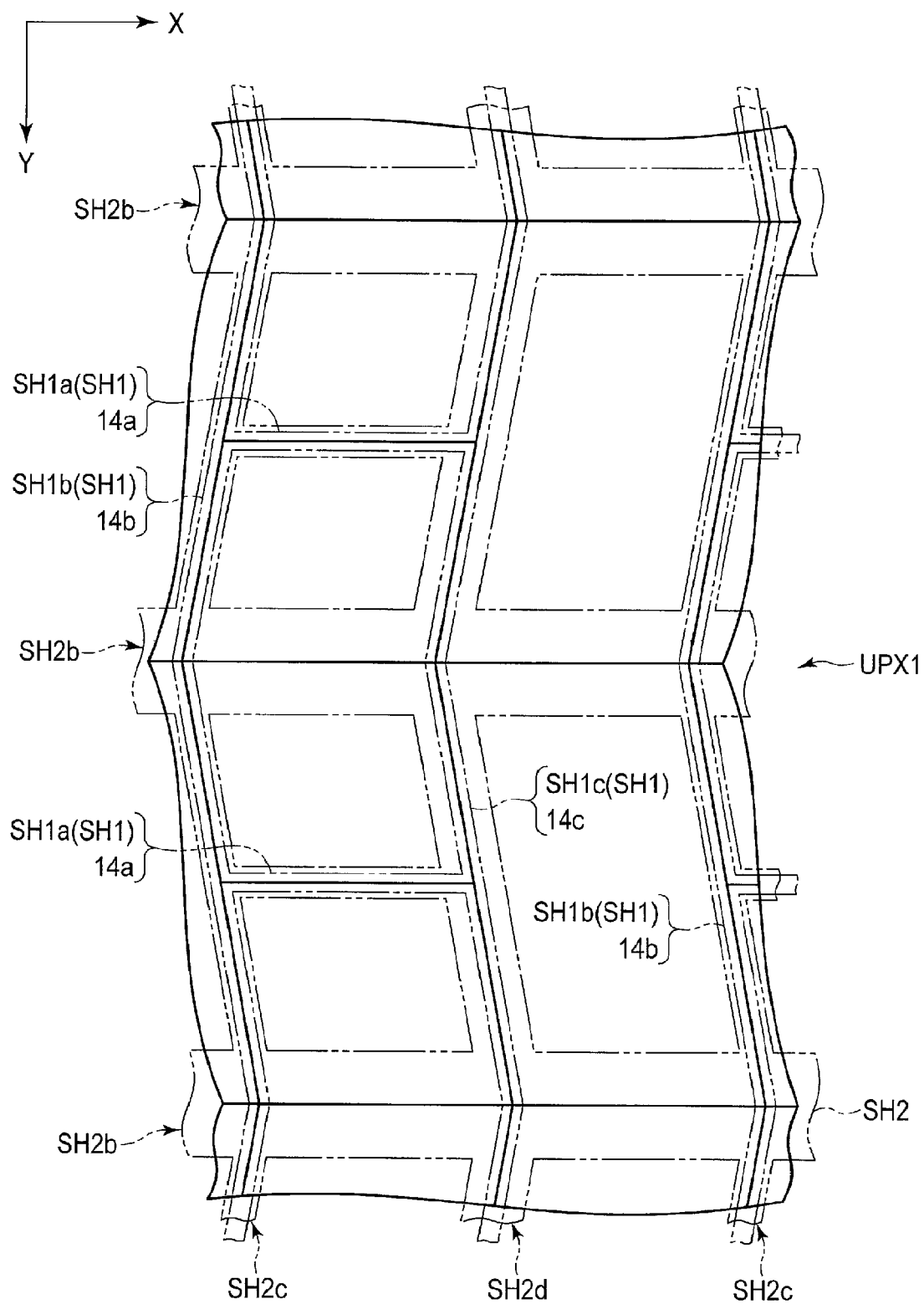
F I G. 9

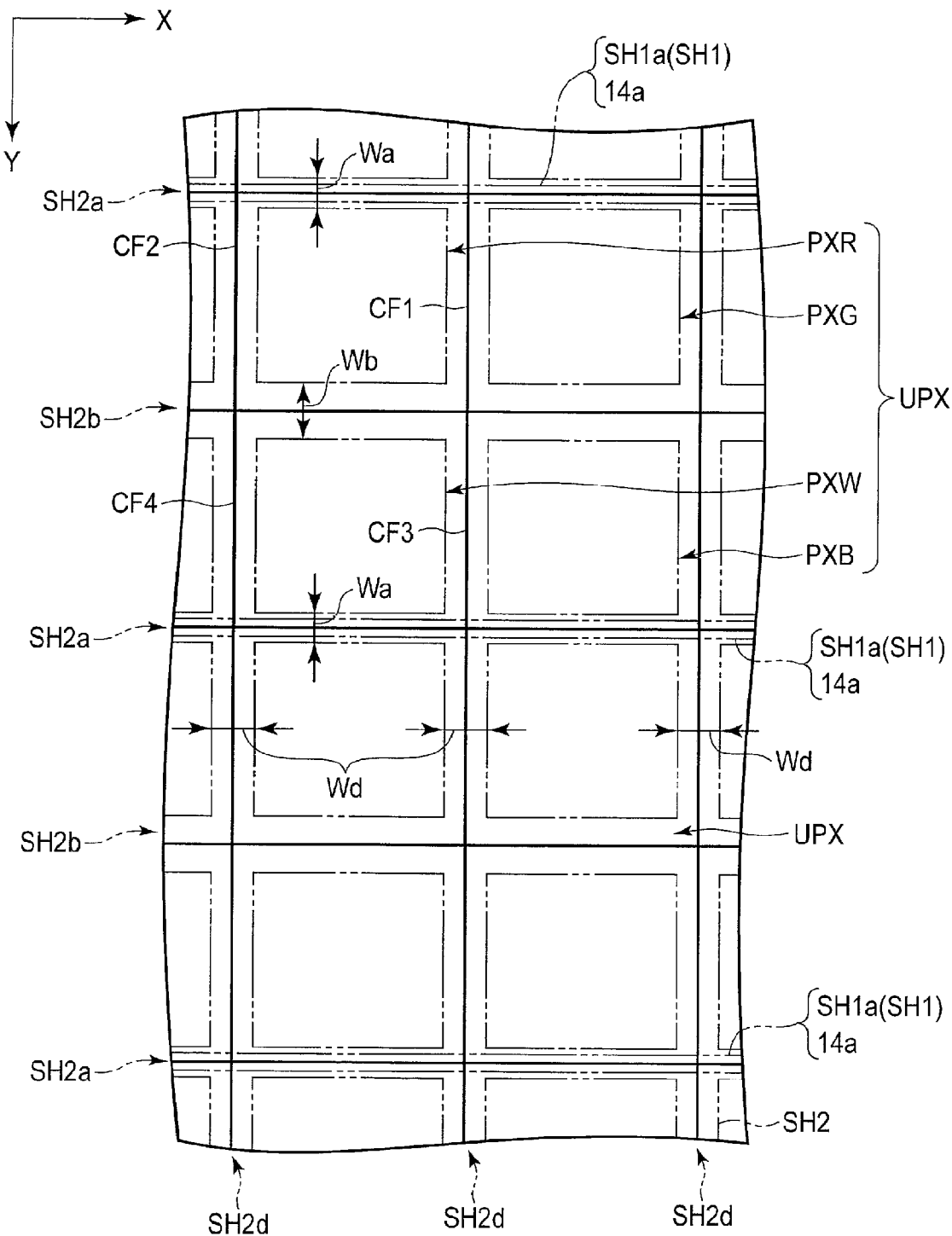
F I G. 11

LIQUID CRYSTAL DISPLAY PANEL

CROSS-REFERENCE TO RELATED APPLICATIONS

This application is based upon and claims the benefit of priority from Japanese Patent Application No. 2014-257751, filed Dec. 19, 2014, the entire contents of which are incorporated herein by reference.

FIELD

Embodiments described herein relate generally to a liquid crystal display panel.

BACKGROUND

In recent years, display devices for use in smartphones or tablet computers have been further required to have a higher resolution and a higher aperture ratio. If pixels are made smaller in order to have a higher resolution, the ratio of the total area of signal lines and a light-shielding layer to the total area of the pixels is increased, thus reducing the aperture ratio. An organic electroluminescence display device is disclosed as an example of a technique for ensuring a given aperture ratio, while achieving a higher resolution. The organic electroluminescence display device includes a first-color sub-pixel, a second-color sub-pixel, and a third-color sub-pixel. The first-color sub-pixel and the second-color sub-pixels are disposed in the same column. The third-color sub-pixel is disposed in another column adjacent to the column in which the first-color and second-color sub-pixels are disposed.

BRIEF DESCRIPTION OF THE DRAWINGS

FIG. 4 is a plan view showing the configuration of an array substrate as shown in FIGS. 1 and 2.

FIG. 6 is a configuration view showing the above unit pixel, and also showing the first and second light-shielding layers and color filters.

FIG. 7 is a cross-sectional view of the liquid crystal display panel which is taken along line VII-VII in FIG. 5.

FIG. 8 is a configuration view showing a unit pixel in a liquid crystal display panel of a liquid crystal display device according to modification 1 of the above embodiment, and also showing first projection portions, second projection portions, third projection portions, a first light-shielding layer, a second light-shielding layer and color filters.

FIG. 9 is a configuration view showing a unit pixel in a liquid crystal display panel of a liquid crystal display device according to modification 2 of the above embodiment, and also showing first projection portions, second projection portions, third projection portions, a first light-shielding layer, a second light-shielding layer and color filters.

FIG. 11 is a configuration view showing the unit pixels as shown in FIG. 10, and also showing a first light-shielding layer, a second light-shielding layer and color filters.

DETAILED DESCRIPTION

In general, according to one embodiment, there is provided a liquid crystal display panel comprising: a first substrate which includes an organic insulating film, and first and second pixel electrodes formed above the organic insulating film and adjacent to each other; a second substrate located opposite to the first and second substrates, and spaced from the first substrate; a liquid crystal layer held between the first and second substrates; a first color filter located opposite to the first pixel electrode; and a second color filter located opposite to the second pixel electrode and having a color different from that of the first color filter. The organic insulating film includes a first projection portion located opposite to the boundary between the first and second color filters, extending along the boundary, and projecting toward the second substrate.

Embodiments and modifications will be described hereinafter with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

First of all, a liquid crystal display device according to an embodiment will be described in detail.

The liquid crystal display device can be applied to various devices such as a smartphone, a tablet computer, a cell phone, a personal computer, a television receiver, a vehicle equipment and a games console.

Figure 1:
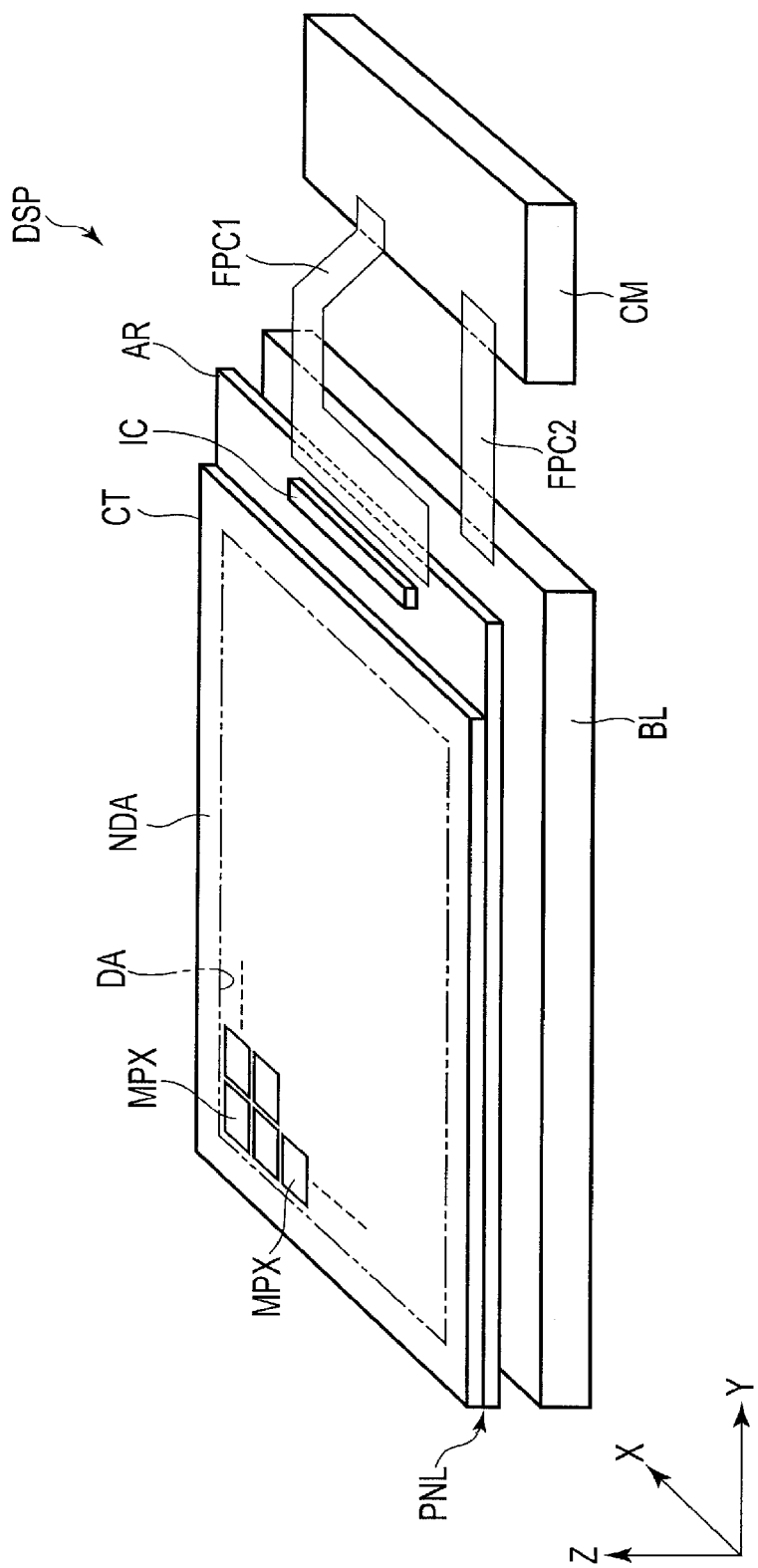
FIG. 1 is a perspective view showing a liquid crystal display device according to an embodiment.

FIG. 1 is a perspective view showing the configuration of a liquid crystal display device DSP. In the embodiment, a first direction X and a second direction Y are perpendicular to each other; however, they may intersect each other at an angle other than 90°. Also, a third direction Z is perpendicular to each of the first direction X and the second direction Y.

The liquid crystal display device DSP comprises an active-matrix liquid crystal display panel PNL, a driver IC chip IC which drives the liquid crystal display panel PNL, a backlight unit BL which illuminates the liquid crystal display panel PNL, a control module CM, flexible wiring boards FPC1 and FPC2, etc.

The liquid crystal display panel PNL comprises an array substrate AR and a counter-substrate CT located opposite to the array substrate AR. In the embodiment, the array substrate AR functions as a first substrate, and the counter-substrate CT functions as a second substrate. The liquid crystal display panel PNL includes a display area DA which displays an image and a non-display area NDA which is formed in the shape of a frame in such a way as to surround the display area DA. The liquid crystal display panel PNL comprises a plurality of main pixels MPX arranged in a matrix in the first direction X and the second direction Y in the display area DA. Each of the main pixels MPX corresponds to a group of three sub-pixels to be described later.

The backlight unit BL is provided at a rear surface of the array substrate AR. As the structure of the backlight unit BL, various structures can be applied. However, a detailed explanation of the structure of the backlight unit BL will be omitted. The driver IC chip IC is mounted on the array substrate AR. The flexible wiring board FPC1 connects the liquid crystal display panel PNL and the control module CM. The flexible wiring board FPC2 connects the backlight unit BL and the control module CM to each other.

The liquid crystal display device DSP having the above structure is a so-called transmissive liquid crystal display device in which sub-pixels are selectively caused to transmit therethrough light incident from the backlight unit BL on the liquid crystal display panel PNL to display an image. However, the liquid crystal display device DSP may be provided as a reflective liquid crystal display device in which sub-pixels are selectively caused to reflect natural light (external light) emitted from the outside toward the liquid crystal display panel PNL to display an image or as a transreflective liquid crystal display device having both the functions of the transmission type and reflection type liquid crystal display devices.

Figure 2:
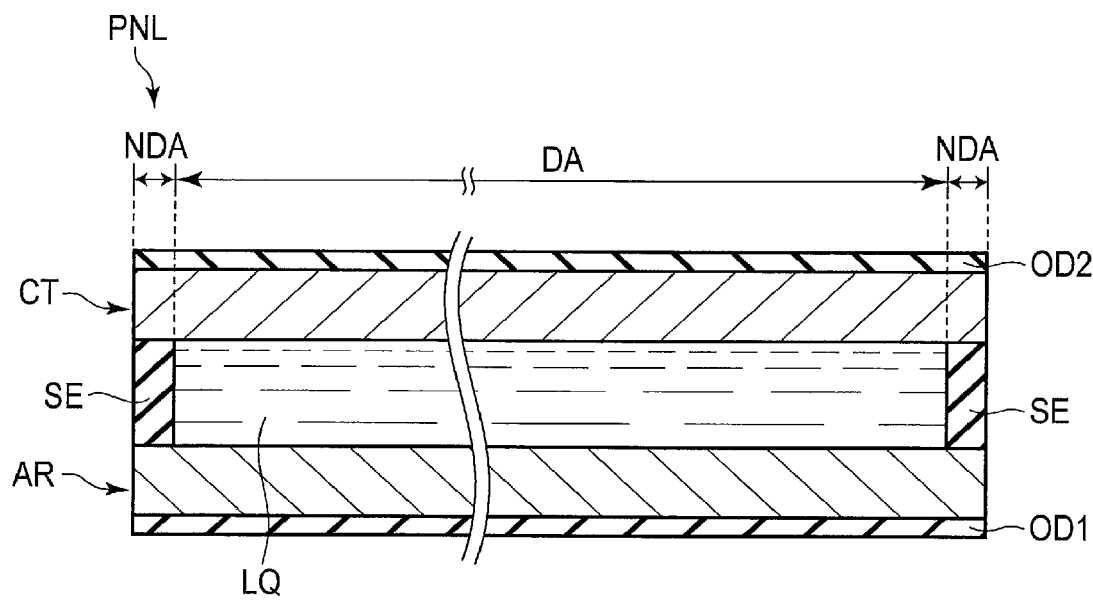
FIG. 2 is a cross-sectional view showing a liquid crystal display panel as shown in FIG. 1.

FIG. 2 is a cross-sectional view showing the liquid crystal display panel PNL.

As shown in FIG. 2, the liquid crystal display panel PNL comprises the array substrate AR, the counter-substrate CT, a liquid crystal layer LQ, a sealing member SE, a first optical element OD1, a second optical element OD2, etc. The array substrate AR and the counter-substrate CT will be described later in detail.

The sealing member SE is located in the non-display area NDA, and joins the array substrate AR and the counter-substrate CT to each other. The liquid crystal layer LQ is held between the array substrate AR and the counter-substrate CT. The first optical element OD1 and the liquid crystal layer LQ are located on opposite sides of the array substrate AR, respectively; that is, they are located opposite to each other with respect to the array substrate AR. The second optical element OD2 and the liquid crystal layer LQ are located on opposite sides of the counter-substrate CT, respectively; that is, they are located opposite to each other with respect to the counter-substrate CT. The first optical element OD1 and the second optical element OD2 each include a polarizer. It should be noted that each of the first optical element OD1 and the second optical element OD2 may include another optical element such as a retardation film.

Figure 3:
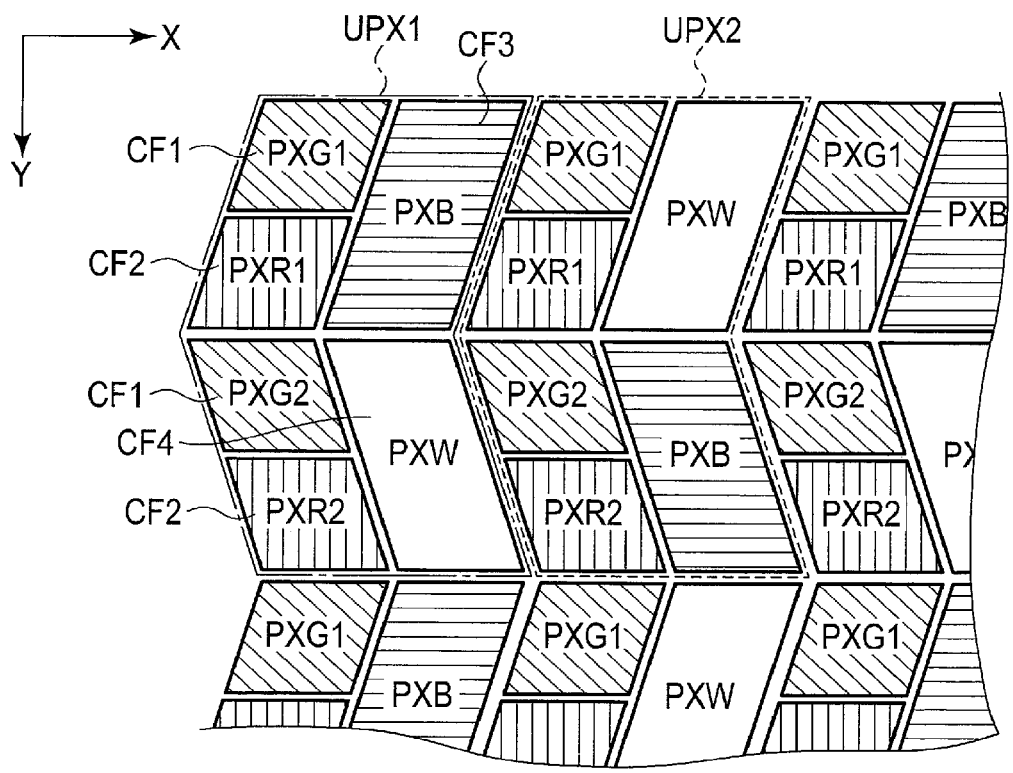
FIG. 3 is a view showing an example of an arrangement of pixels in the liquid crystal display panel as shown in FIGS. 1 and 2.

FIG. 3 is a view showing an example of a pixel array in the display area DA in the liquid crystal display panel PNL. FIG. 3 shows two kinds of unit pixels, i.e., unit pixels UPX1 and UPX2.

In such a manner, as shown in FIG. 3, the liquid crystal display panel PNL includes two kinds of unit pixels. That is, as the unit pixels, unit pixels UPX1 and UPX2 are provided. Each of the unit pixels UPX1 and UPX2 is minimum unit for use in displaying a color image. The unit pixels UPX1 and UPX2 each include sub-pixels PXG1, PXR1, PXB, PXG2, PXR2 and PXW.

The sub-pixels PXG1 and PXG2 are first-color pixels, and include color filters CF1 having a first color. The sub-pixels PXR1 and PXR2 are second-color pixels, and include color filters CF2 having a second color. The sub-pixel PXB is a third-color pixel, and includes a color filter CF3 having a third color. The sub-pixel PXW is a fourth-color pixel, and includes a color filter CF4 having a fourth color. For example, the first color is green; the second color is red; the third color is blue; and the fourth color is white or substantially transparent. The color filters CF1 to CF3 are formed of colored resin material. The color filter CF4 is formed of transparent resin material or resin material having faint color. Thus, there can be a case where the color filter CF4 should be referred to as a non-tinted filter.

However, each of the unit pixels UPX1 and UPX2 may include sub-pixels of colors other than green, red, blue and white, or may be made up of three sub-pixels excluding a white sub-pixel, i.e., green, red and blue sub-pixels. Furthermore, in accordance with the configuration of each unit pixel, in the display area DA, one kind of unit pixels UPX (i.e., either unit pixels UPX1 or unit pixels UPX2) may be arranged, or three or more kinds of unit pixels UPX (unit pixels UPX1 and UPX2 and unit pixels which differ in structure from the unit pixels UPX1 and UPX2) may be arranged.

In the following description, for example, light having a wavelength which falls within the range of 380 to 780 nm is defined as "visible light". "Blue" is defined as color of light whose transmittance has a peak falling within a first wavelength range of 380 nm or more less than 490 nm. "Green" is defined as color of light whose transmittance has a peak falling within a second wavelength range of 490 nm or more less than 590 nm. "Red" is defined as color of light whose transmittance has a peak falling within a third wavelength range of 590 or more less than 780 nm. The "substantially transparent" filter covers a faintly colored filter whose color corresponds to any color of the above-defined visible light, in addition to a non-tinted filter.

Unit pixels UPX1 are arranged in the second direction Y as a column of unit pixels UPX1. Similarly, unit pixels UPX2 are arranged in the second direction Y as a column of unit pixels UPX2. To be more specific, a plurality of columns of unit pixels UPX1 in the second direction Y and a plurality of columns of unit pixels UPX2 in the second direction are alternately arranged in the first direction X.

In each of the unit pixels UPX1 and UPX2, the sub-pixels PXG1 and PXR1 are adjacent to each other in the second direction Y; the sub-pixels PXG2 and PXR2 are also adjacent to each other in the second direction; and the sub-pixels PXR1 and PXG2 are also adjacent to each other in the second direction Y. In each unit pixel UPX1, the sub-pixels PXG1 and PXR1 are adjacent to the sub-pixel PXB in the first direction X; and the sub-pixels PXG2 and PXR2 are adjacent to the sub-pixel PXW in the first direction X. In each unit pixel UPX2, the sub-pixels PXG1 and PXR1 are adjacent to the sub-pixel PXW in the first direction X; and the sub-pixels PXG2 and PXR2 are adjacent to the sub-pixel PXB in the first direction X. Furthermore, with respect to any adjacent unit pixels UPX1 and UPX2, the sub-pixel PXB in the unit pixel UPX1 are adjacent to the sub-pixels PXG1 and PXR1 in the unit pixel UPX2 in the first direction X. Also, the sub-pixel PXW in the unit pixel UPX1 is adjacent to the sub-pixels PXG2 and PXR2 in the unit pixel UPX2 in the first direction X.

In the example shown in FIG. 3, in each of the unit pixels UPX1 and UPX2, the sub-pixels PXG1, PXG2, PXR1 and PXR2 have the substantially the same first area. Each of the sub-pixels PXB and PXW has a second area which is larger than the first area. For example, the second area is almost double the first area. For example, the sub-pixels PXG1, PXG2, PXR1, PXR2, PXB and PXW have substantially the same width in the first direction X, and in the second direction Y, the sub-pixels PXB and PXW have a length which is almost double that of each of the sub-pixels PXG1, PXG2, PXR1 and PXR2. That is, the sizes of the sub-pixels PXB and PXW, which are blue and white sub-pixels, respectively, are greater than those of the sub-pixels PXR1 and PXR2, which are red sub-pixels, and those of the sub-pixels PXG1 and PXG2, which are green sub-pixels; and the number of the sub-pixels PXB and PXW is smaller than that of the sub-pixels PXR1, PXR2, PXG1 and PXG2. By virtue of this feature, the aperture ratios of the unit pixels UPX1 and UPX2 can be improved without reducing an effective resolution.

It should be noted that the area of the sub-pixel PXB may be different from that of the sub-pixel PXW. Also, the sub-pixels PXG1, PXG2, PXR1 and PXR2 may have different areas.

The color filters CF1 to CF4 are disposed in accordance with the layouts of the above sub-pixels, and have areas determined in accordance with the sizes of the sub-pixels. To be more specific, the color filters CF1 are arranged in a predetermined pattern, the color filters CF2 are also arranged in a predetermined pattern, and the color filters CF1 and CF2 are alternately arranged in the second direction Y. The color filters CF1 and CF2 have substantially the same first area. Also, the color filters CF3 are arranged in a predetermined pattern, the color filters CF4 are also arranged in a predetermined pattern, and color filters CF3 and CF4 are alternately arranged in the second direction Y. The color filters CF3 and CF4 have substantially the same second area, which is larger than the first area. For example, the second area is almost double the first area.

Furthermore, the shape of each of the above sub-pixels is not limited to such a substantial parallelogram as shown in FIG. 3. That is, it may be a square or a rectangle which is longitudinal in the second direction Y.

For example, if the shape of each of the sub-pixels is a substantial parallelogram, two kinds of unit pixels, i.e., the unit pixels UPX1 and UPX2, are combined, thereby also forming a larger number of domains with respect to the sub-pixels PXB and PXW, and thus compensating for a viewing-angle characteristic. Thus, with respect to the viewing-angle characteristic, the combination of the unit pixels UPX1 and UPX2 (two unit pixels) is a minimum unit in a displayed color image.

It should be noted that each of the unit pixels UPX1 and UPX2 is made up of two main pixels MPX. In each unit pixel UPX1, one of the two main pixels MPX comprises three adjacent sub-pixels PXG1, PXR1 and PXB, and the other comprises three adjacent sub-pixels PXG2, PXR2 and PXW. In each unit pixel UPX2, one of the two main pixels MPX comprises three adjacent sub-pixels PXG1, PXR1 and PXW, and the other comprises three adjacent sub-pixels PXG2, PXR2 and PXB.

FIG. 4 is a plan view showing the configuration of the array substrate AR.

As shown in FIG. 4, the array substrate AR comprises scanning lines G, signal lines S, pixel electrodes PE, switching elements SW, a first drive circuit DR1, a second drive circuit DR2, etc.

In the display area DA, the scanning lines G extend in the first direction X, and are arranged and spaced from each other in the second direction Y. In the embodiment, the scanning lines G linearly extend in the first direction X. Also, in the display area DA, the signal lines S extend in the second direction Y, intersect the scanning lines G, and are arranged and spaced from each other in the first direction X. It should be noted that the signal lines S need not always linearly extend; i.e., they may be partially bent or extend in a direction intersecting the first direction X and the second direction Y. In each sub-pixel PX, a pixel electrode PE and a switching element SW are provided. The switching element SW is electrically connected to an associated scanning line G and an associated signal line S. In the embodiment, the switching element SW is formed of a double-gate thin-film transistor. However, the switching element SW is not limited to the double-gate thin-film transistor, but can be variously modified. For example, it may be formed of a single-gate thin-film transistor. The pixel electrode PE is electrically connected to the switching element SW.

In the example shown in FIG. 4, each of unit pixels UPX2 includes sub-pixels PXG1, PXR1, PXW, PXG2, PXR2 and PXB. In such a manner, each unit pixel UPX2 includes six sub-pixels; and three signal lines S and three scanning lines G are assigned to each unit pixel UPX2.

The first drive circuit DR1 and the second drive circuit DR2 are disposed in the non-display area NDA. The first drive circuit DR1 is electrically connected to portions of the scanning lines G which are located in the non-display area NDA. The second drive circuit DR2 is electrically connected to portions of the signal lines S which are located in the non-display area NDA. The first drive circuit DR1 supplies a control signal to each of the scanning lines G. The second drive circuit DR2 supplies an image signal (for example, a video signal) to each of the signal lines S.

Figure 5:
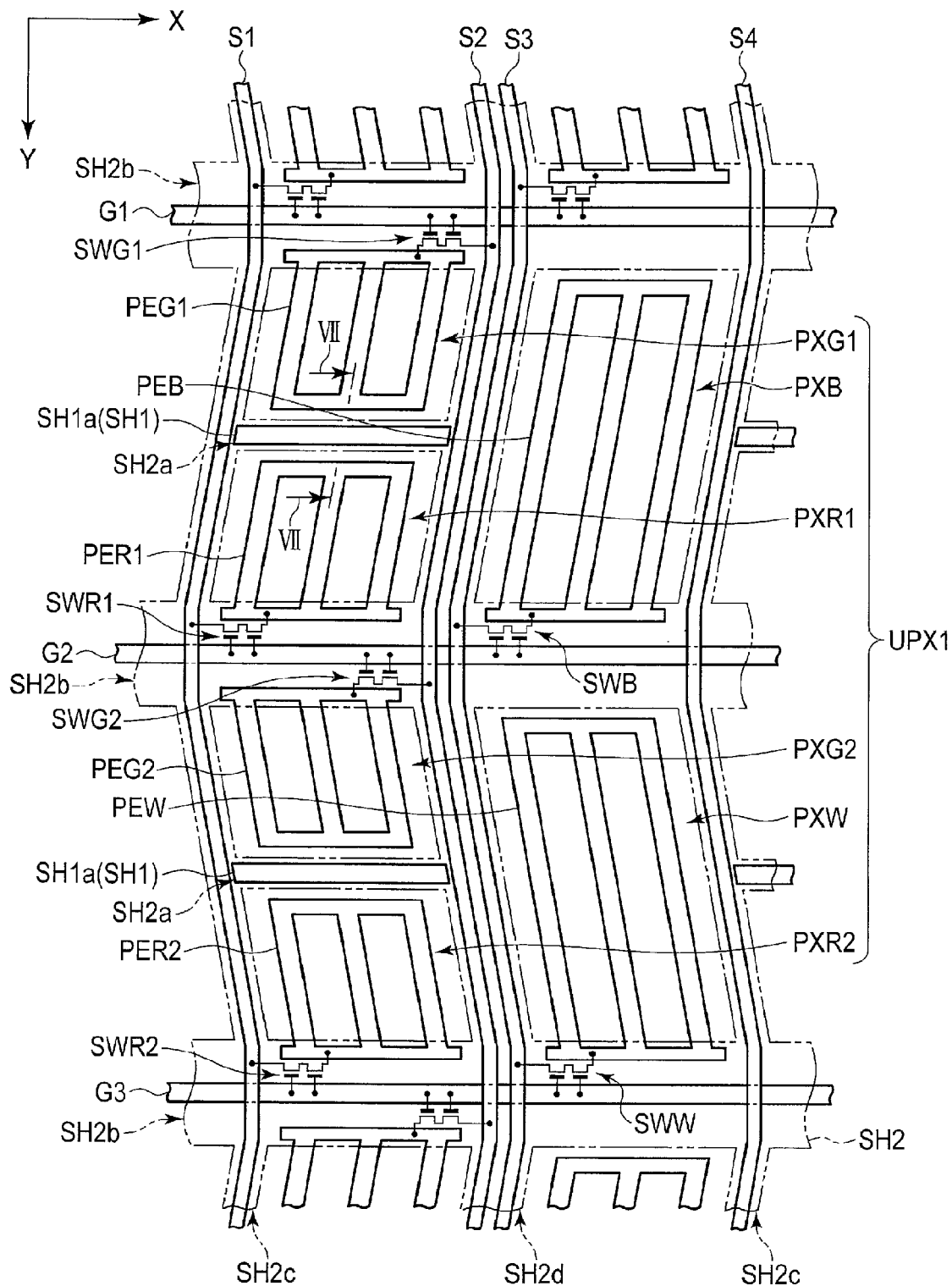
FIG. 5 is a configuration view showing a unit pixel in the liquid crystal display panel, and also showing scanning lines, signal lines, switching elements, pixel electrodes, a first light-shielding layer and a second light-shielding layer.

FIG. 5 is a view showing the configuration of a unit pixel UPX1 in the liquid crystal display panel PNL. Also, FIG. 5 shows scanning lines G, signal lines S, switching elements SW, pixel electrodes PE, a first light-shielding layer SH1 and a second light-shielding layer SH2.

It should be noted that in the example shown in FIG. 5, the unit pixel UPX1 has a structure adapted for a fringe field switching (FFS) mode which is a display mode, and a common electrode is not shown. Scanning lines G1 to G3, signal lines S1 to S4, pixel electrodes PE and the first light-shielding layer SH1 are formed in the above array substrate, whereas the light-shielding layer SH2 is formed in the above counter-substrate. It should be noted that in the drawings, the first light-shielding layer SH1 is indicated by a solid line, and the second light-shielding layer SH2 is indicated by a two-dot chain line.

As shown in FIG. 5, if the sub-pixels PX, the scanning lines G and the signal lines S are observed, the following positional relationship is established.

The sub-pixels PXG1, PXR1, PXG2 and PXR2 are formed between the signal line S1 (first signal line) and the signal line S2 (second signal line). The sub-pixels PXG1 and PXR1 are adjacent to each other in the second direction Y, with no scanning line interposed between them. The sub-pixels PXR1 and PXG2 are adjacent to each other in the second direction Y, with the scanning line G2 interposed between them. The sub-pixels PXG2 and PXR2 are adjacent to each other in the second direction Y, with no scanning line interposed between them. The sub-pixels PXB and PXW are formed between the signal line S3 (third signal line) and the signal line S4 (fourth signal line). The sub-pixels PXB and PXW are adjacent to each other in the second direction Y, with the scanning line G2 interposed between them. The scanning lines G1 to G3 (the first to third scanning lines) are formed without crossing any of the sub-pixels PX. The sub-pixel PXB is adjacent to the sub-pixels PXG1 and PXR1 in the first direction X, with the signal lines S2 and S3 interposed between the sub-pixel PXB and the sub-pixels PXG1 and PXR1. The sub-pixel PXW is adjacent to the sub-pixels PXG2 and PXR2 in the first direction X, with the signal lines S2 and S3 interposed between the sub-pixel PXW and the sub-pixels PXG2 and PXR2.

The sub-pixel PXG1 comprises a switching element SWG1 electrically connected to the signal line S2 and the scanning line G1 and a pixel electrode PEG1 electrically connected to the switching element SWG1.

The sub-pixel PXR1 comprises a switching element SWR1 electrically connected to the signal line S1 and the scanning line G2 and a pixel electrode PER1 electrically connected to the switching element SWR1.

The sub-pixel PXG2 comprises a switching element SWG2 electrically connected to the signal line S2 and the scanning line G2 and a pixel electrode PEG2 electrically connected to the switching element SWG2.

The sub-pixel PXR2 comprises a switching element SWR2 electrically connected to the signal line S1 and the scanning line G3 and a pixel electrode PER2 electrically connected to the switching element SWR2.

The sub-pixel PXB comprises a switching element SWB electrically connected to the signal line S3 and the scanning line G2 and a pixel electrode PEB electrically connected to the switching element SWB.

The sub-pixel PXW comprises a switching element SWW electrically connected to the signal line S3 and the scanning line G3 and a pixel electrode PEW electrically connected to the switching element SWW.

As described later, in the embodiment, the pixel electrodes PE are located between the common electrode and the liquid crystal layer. The pixel electrodes PE are each formed in a predetermined shape such that an electric field generated between the pixel electrodes PE and the common electrode can be applied to the liquid crystal layer. In the example shown in FIG. 5, the pixel electrodes PE include slits.

On the other hand, if the pixel electrode PE, the scanning lines G and the signal lines S are observed, the following positional relationship is established.

The pixel electrodes PEG1, PER1, PEG2 and PER2 are formed between the signal lines S1 and S2. The pixel electrodes PEG1 and PER1 are adjacent to each other in the second direction Y, with no scanning line interposed between them. The pixel electrodes PER1 and PEG2 are adjacent to each other in the second direction Y, with the scanning line G2 interposed between them. The pixel electrodes PEG2 and PER2 are adjacent to each other in the second direction Y, with no scanning line interposed between them. Pixel electrodes PEB and PEW are located between the signal lines S3 and S4. The pixel electrodes PEB and PEW are adjacent to each other in the second direction Y, with the scanning line G2 interposed between them. The pixel electrode PEB is adjacent to the pixel electrodes PEG1 and PER1 in the first direction X, with the signal lines S2 and S3 interposed between the pixel electrode PEB and the pixel electrodes PEG1 and PER1. The pixel electrode PEW is adjacent to the pixel electrodes PEG2 and PER2 in the first direction X, with the signal lines S2 and S3 interposed between the pixel electrode PEW and the pixel electrodes PEG2 and PER2.

The first light-shielding layer SH1 includes a plurality of first light-shielding portions SH1a. The first light-shielding portions SH1a are located between the pixel electrodes PEG1 and PER1 and between the pixel electrodes PEG2 and PER2. Also, the first light-shielding portions SH1a are located between the scanning lines G1 and G2 and between the scanning lines G2 and G3. Each of the first light-shielding portions SH1a is located in part of a region between associated adjacent pixel electrodes PE, in which lines (scanning lines G and signal lines S) are not formed. In the embodiment, the first light-shielding portions SH1a are each formed in the shape of a band, and extend in the first direction X.

The second light-shielding layer SH2 is shaped along the boundaries between sub-pixels PX, and made up of a plurality of extension portions formed in the shape of a band. The second light-shielding layer SH2 is located opposite to the scanning lines G1 to G3 and the signal lines S1 to S4. Also, the second light-shielding layer SH2 is located opposite to the switching elements each of which is simplified in FIG. 5. Areas surrounded by the second light-shielding layer SH2 serve as areas for use in displaying an image.

The second light-shielding layer SH2 includes a plurality of first extension portions SH2a, a plurality of second extension portions SH2b, a plurality of third extension portions SH2c and a plurality of fourth extension portions SH2d. In the embodiment, the first extension portions SH2a, the second extension portions SH2b, the third extension portions SH2c and the fourth extension portions SH2d are formed integrally with each other. The first extension portions SH2a extend in the first direction X, and are located opposite to the first light-shielding portions SH1a. The second extension portions SH2b extend in the first direction X, and are spaced from each other in the second direction Y, with the first extension portions SH2a interposed between them. The second extension portions SH2b are located opposite to at least part of the switching elements SW and the scanning lines G. The third extension portions SH2c and the fourth extension portions SH2d extend in the second direction Y. Each of the third extension portions SH2c is located opposite to the signal line S1 or S4, and extend along the signal line S1 or S4. The fourth extension portion SH2d is located opposite to the signal lines S2 and S3, and extend along the signal lines S2 and S3.

In the embodiment, with respect to pixel electrodes PEG1, PER1 and PEB forming a single main pixel, the pixel electrode PEB is adjacent to the pixel electrodes PEG1 and PER1 in the first direction X. With respect to pixel electrodes PEG2, PER2 and PEW forming another single main pixel, the pixel electrode PEW is adjacent to the pixel electrodes PEG2 and PER2 in the first direction X. Thus, the pixel electrodes PEG1 and PEG2 function as first pixel electrodes, the pixel electrodes PER1 and PER2 function as second pixel electrodes, and the pixel electrodes PEB and PEW function as third pixel electrodes.

The pixel electrode PEG1 is supplied with a first image signal through the signal line S2 and the switching element SWG1. The pixel electrode PER1 is supplied with a second image signal through the signal line S1 and the switching element SWR1. The pixel electrode PEB is supplied with a third image signal through the signal line S3 and the switching element SWB. The pixel electrode PEG2 is supplied with a fourth image signal through the signal line S2 and the switching element SWG2. The pixel electrode PER2 is supplied with a fifth image signal through the signal line S1 and the switching element SWR2. The pixel electrode PEW is supplied with a sixth image signal through the signal line S3 and the switching element SWW.

In an arbitrary display drive period (for example, a single frame period), the polarities of the first to sixth image signals are not especially limited; that is, they can be variously set.

However, it is preferable that in the arbitrary display drive period, the first image signal and the second image signal be set to have the same polarlity, and the fourth image signal and the fifth image signal be set to have the same polarity. This is intended to restrict generation of an undesired electric field between the pixel electrodes PEG1 and PER1 and that between the pixel electrodes PEG2 and the PER2, thereby restricting an adverse effect of the electric field on the liquid crystal layer. This can also be expected to be obtained in the case where the first light-shielding portions SH1a have conductivity, and are formed in the liquid crystal display panel PNL, but it can be expected to be more reliably obtained in the case where the liquid crystal display panel PNL is formed without the first light-shielding portions SH1a having conductivity, or the first light-shielding portions SH1a do not have conductivity and are formed in the liquid crystal display panel PNL.

FIG. 6 is a configuration view showing the unit pixel UPX1 provided as shown in FIG. 5, and also showing the first light-shielding layer SH1, the second light-shielding layer SH2 and the color filters CF.

As shown in FIG. 6, the color filter CF1 of the sub-pixel PXG1 is located opposite to the pixel electrode PEG1 provided as shown in FIG. 5; the color filter CF2 of the sub-pixel PXR1 is located opposite to the pixel electrode PER1 provided as shown in FIG. 5; the color filter CF3 of the sub-pixel PXB is located opposite to the pixel electrode PEB provided as shown in FIG. 5; the color filter CF1 of the sub-pixel PXG2 is located opposite to the pixel electrode PEG2 provided as shown in FIG. 5; the color filter CF2 of the sub-pixel PXR2 is located opposite to the pixel electrode PER2 provided as shown in FIG. 5; and the color filter CF4 of the sub-pixel PXW is located opposite to the pixel electrode PEW provided as shown in FIG. 5.

Each of the first extension portions SH2a is located opposite to the boundary between associated color filters CF1 and CF2, and extends along the boundary.

The second light-shielding layer SH2 is shaped along the boundaries between the color filters CF. To be more specific, as described above, each first extension portion SH2a is located opposite to the boundary between associated color filters CF1 and CF2, and extend along the boundary. Each second extension portion SH2b is located opposite to the boundary between associated color filters CF2 and CF1 and that between associated color filters CF4 and CF3, and extend along those boundaries. Each third extension portion SH2c is located opposite to the boundary between associated color filters CF of the unit pixel UPX1 and associated color filers CF of the unit pixel UPX2, which is adjacent to the unit pixel UPX1 in the first direction X, and extend along the boundary. Each fourth extension portion SH2d is located opposite to the boundary between associated color filters CF of the unit pixel UPX1, which are adjacent in the first direction X, and extends along the boundary.

In the embodiment, the first to fourth extension portions SH2a to SH2d have widths such that Wa<Wb, Wc<Wd, Wa<Wc, and Wa<Wd, where Wa is the width of each first extension portion SH2a in the second direction Y, Wb is the width of each second extension portion SH2b in the second direction Y, Wc is the width of each third extension portion SH2c in the first direction X, and Wd is the width of each fourth extension portion SH2d in the first direction X.

FIG. 7 is a cross-sectional view of the liquid crystal display panel PNL which is taken along line VII-VII in FIG. 5.

As shown in FIG. 7, the array substrate AR is formed using a first insulating substrate 10 having a light transmitting property, such as a glass substrate or a resin substrate. The array substrate AR comprises a first insulating film 11, a second insulating film 12, a third insulating film 13, a fourth insulating film 14, a fifth insulating film 15, a common electrode CE, pixel electrodes PEG1 and PER1, a first alignment film AL1, etc.

The first insulating film 11, the second insulating film 12 and the third insulating film 13 are formed in this order on the first insulating substrate 10. The fourth insulating film (organic insulating film) 14 is formed on the third insulating film 13. The fourth insulating film 14 is located above the scanning lines, the signal lines, the switching elements, etc. The fourth insulating film 14 is formed of an organic material such as an acrylic resin. The fourth insulating film 14 includes first projection portions 14a. Each of the first projection portions 14a is located opposite to the boundary between associated color filters CF1 and CF2, extends along the boundary, and projects toward the counter-substrate CT. In the embodiment, the first projection portions 14a project toward the counter-substrate CT to a level higher than that of each of the pixel electrodes PEG1 and PER1.

The fourth insulating film 14 is formed by coating the third insulating film 13, etc., with a photosensitive organic material to form a photosensitive organic film, and then, for example, exposing the photosensitive organic film using a patterning. To be more specific, this exposure is performed with a photolithographic mask including a given pattern having portions having different ultraviolet transmittance values. As a result, the fourth insulating film 14 including first projection portions 14a is formed.

Alternatively, the fourth insulating film 14 including first projection portions 14a can also be formed by coating the third insulating film 13, etc., with a photosensitive organic material, and repeatedly performing patterning. The kind of the above organic material to be applied to coating may be changed.

The common electrode CE is formed on the fourth insulating film 14. The common electrode CE includes a conductive layer CL and first light-shielding portions SH1a formed on the conductive layer CL. The conductive layer CL is also formed on the first projection portions 14a. The conductive layer CL is shared among the sub-pixels PX. The conductive layer CL includes openings which surround contact regions between the switching elements and the pixel electrodes PE. For example, the conductive layer CL is formed of a transparent conductive material such as indium zinc oxide (IZO) or indium tin oxide (ITO).

The first light-shielding portions SH1a are located above the first projection portions 14a. In the embodiment, the first light-shielding portions SH1a are located opposite to the first projection portions 14a and on the conductive layer CL, and are electrically connected to the conductive layer CL. The first light-shielding portions SH1a (first light-shielding layer SH1) form part of the common electrode CE. The first light-shielding portions SH1a are formed of a conductive material having a light-shielding property. As the material of the first light-shielding portions SH1a, various metallic materials such as aluminum and metal having a lower optical reflectivity than that of aluminum can be applied.

The fifth insulating film (interlayer insulating film) 15 is formed on the fourth insulating film 14 and the common electrode CE. The first insulating film 11, the second insulating film 12, the third insulating film 13 and the fifth insulating film 15 are formed of an inorganic material, for example, silicon nitride (SiN) or silicon oxide (SiO).

The pixel electrodes PEG1 and PER1 are formed on the fifth insulating film 15 and are located opposite to the conductive layer CL (common electrode CE). The pixel electrodes PEG1 and PER1 are provided, with the first projection portions 14a and the first light-shielding portions SH1a interposed between the pixel electrodes PEG1 and PER1. The pixel electrodes PEG1 and PER1 are formed of a conductive material. For example, the pixel electrodes PEG1 and PER1 are formed of a transparent conductive material such as IZO or ITO. The first alignment film AL1 is formed on the fifth insulating film 15 and the pixel electrodes PEG1 and PER1. The first alignment film AL1 is formed of, for example, a material which exhibits a horizontal alignment property.

On the other hand, the counter-substrate CT is formed using a second insulating substrate 20 having a light transmitting property such as a glass substrate or a resin substrate. The counter-substrate CT comprises the first extension portion SH2a (second light-shielding layer SH2), the color filters CF1 and CF2, an overcoat layer OC, the second alignment film AL2, etc.

The first extension portion SH2a is formed on a side of the second insulating film 20 which is located opposite to the array substrate AR. The first extension portion SH2a is located opposite to the first light-shielding portion SH1a. The color filter CF1 is located opposite to the pixel electrode PEG1. The color filter CF2 is located opposite to the pixel electrode PER1. The color filters CF1 and CF2 include end portions which overlap with the first extension portion SH2a. The overcoat layer OC is formed of a transparent resin material, and covers the color filters CF1 and CF2, etc. The second alignment film AL2 is formed on a side of the overcoat layer OC which is located opposite to the array substrate AR. Also, the second alignment film AL2 is formed of a material which exhibits a horizontal alignment property.

It should be noted that in the example shown in FIG. 7, the color filters CF such as the color filters CF1 and CF2 are formed in the counter-substrate CT, but may be formed in the array substrate AR.

In the embodiment, the liquid crystal layer LQ is formed such that Ta<Tb and Ta<Tc, where Ta is the thickness of part of the liquid crystal layer LQ which is located opposite to the first projection portion 14a, Tb is the thickness of part of the liquid crystal layer LQ which is located opposite to the pixel electrode PEG1, and Tc is the thickness of part of the liquid crystal layer LQ which is located opposite to the pixel electrode PER1. That is, the thickness Ta is less than each of the thickness Tb and the thickness Tc.

According to the embodiment, the liquid crystal display device DSP having the above structure comprises: the array substrate AR including the fourth insulating film 14 and the pixel electrodes PEG1 and PER1; the counter-substrate CT; the liquid crystal layer LQ; and the color filters CF1 and CF2. As an object of the liquid crystal display device according to the embodiment, it is necessary to restrict occurrence of a color mixture between the sub-pixels PXG1 and PXR1. There is a case where the area between the pixel electrodes PEG1 and PER1 is provided as an area in which lines such as scanning lines G or signal lines S, which causes light shielding are not provided. In this case, in particular, it is necessary to restrict occurrence of a color mixture.

The color mixture occurs in the case where light incident on the liquid crystal panel PNL at an angle inclined with respect to the normal to a main surface of the liquid crystal display panel PNL passes through color filters which differ in color from each other. For example, with respect to red part of an image to be displayed at a certain unit pixel, although only light passing through a red color filter located in a red sub-pixel should contribute to formation of the red part, light passing through a green color filter located provided in a green sub-pixel adjacent to the red sub-pixel in the second direction Y also contributes to formation of the red part, along with the light passing through the red color filter. Consequently, the color of the above part is visually recognized as a mixed color of red and green. Such light as causes a color mixture is generated between the boundary between adjacent sub-pixels. However, with respect to each of the sub-pixels, in the case where the size of each sub-pixel or the width of each sub-pixel in the second direction Y is great, most of light passes through a color filter through which the light should pass, thus greatly reducing the rate at which light causing a color mixture contributes to formation of an image to be displayed. Thus, in the case where sub-pixels have a relatively great width in the second direction Y, a color mixture does not easily occur, and lowering of a display quality can be restricted.

However, the liquid crystal display device DSP according to the embodiment has a high resolution of 400 ppi or more or 600 ppi. It is therefore difficult that the widths of the sub-pixels in the second direction Y are set sufficiently great. It should be noted that ppi means pixels per inch, and indicates the number of main pixels MPX per inch. That is, the above pixels mean main pixels MPX. Furthermore, in order to obtain a high aperture ratio, the width Wa of the first extension portion SH2a is less than the width Wb of the second extension portion SH2b. As described above, in order to obtain a high resolution and a high aperture ratio, it is necessary to consider as a subject how to restrict occurrence of a mixed color between the adjacent sub-pixels PXG1 and PXR1 of different colors.

In view of this point, the fourth insulating film 14 includes the first projection portions 14a. Each of the first projection portions 14a is located opposite to the boundary between associated color filters CF1 and CF2, extends along the boundary, and projects toward the counter-substrate CT. The thickness of the liquid crystal layer LQ, as described above, is set such that Ta<Tb and Ta<Tc. Because of provision of the first projection portions 14a, the liquid crystal layer LQ can have regions which are low in modulation factor of polarization. To be more specific, in the above part of the liquid crystal layer LQ which is located opposite to the first projection portions 14a, modulation of polarization not easily occur, as compared with the above part of the liquid crystal layer LQ which is located opposite to the pixel electrodes PEG1 and PER1. Accordingly, the occurrence of a color mixture between the sub-pixels PXG1 and PXR1 can be restricted at the same time as the aperture ratio can be increased to a higher value.

Furthermore, in the embodiment, the first light-shielding portions SH1a (the first light-shielding layer SH1) are located above the first projection portions 14a. Also, the first light-shielding portions SH1a have a light-shielding property, and can block backlight. Thereby, it is possible to further restrict the occurrence of the color mixture.

In addition, in the embodiment, the first light-shielding portions SH1a are also electrically conductive. The potentials of the first light-shielding portions SH1a are definitely set to a common potential. The common potential is a constant potential, for example, a potential close to 0V. Thus, the liquid crystal display panel PNL can further obtain a electric field blocking effect, and can thus further restrict the occurrence of the color mixture. That is, because of provision of the first light-shielding portion SH1a having electrical conductivity, it is possible to generate an electrical field between the pixel electrode PEG1 and the first light-shielding portion SH1a or between the pixel electrode PER1 and the first light-shielding portion SH1a. Since it is possible to restrict generation of an undesired electric field between the pixel electrodes PEG1 and PER1, it is also possible to reduce the possibility with which in the part of the liquid crystal layer LQ, which is located opposite to the first light-shielding portion SH1a, the modulation factor of polarization will be increased to an undesired high value.

By virtue of the above structural features, according to the embodiment, it is possible to obtain a liquid crystal display panel PNL and a liquid crystal display device DSP which can achieve a higher resolution. Alternatively, it is possible to obtain a liquid crystal display panel PNL and a liquid crystal display device DSP which can restrict reduction of the display quality.

Next, a liquid crystal display device DSP according to modification 1 of the above embodiment will be described.

FIG. 8 is a configuration view showing a unit pixel UPX1 in a liquid crystal display panel PNL of the liquid crystal display device DSP according to the modification 1, and also showing first projection portions 14a, second projection portions 14b, third projection portions 14c, a first light-shielding layer SH1, a second light-shielding layer SH2 and color filters CF.

As shown in FIG. 8, in addition to the first projection portions 14a, a fourth insulating film 14 may include the second projection portions 14b and the third projection portions 14c. In the embodiment, the first projection portions 14a, the second projection portions 14b and the third projection portions 14c are formed continuously with each other, respectively.

To be more specific, each of the second projection portions 14b is located opposite to the signal line S1 or S4 provided as shown in FIG. 5, extends along the signal line, and projects toward a counter-substrate CT. Furthermore, each second projection portion 14b is located opposite to the boundary between associated color filters CF1 and CF4 and that between associated color filters CF2 and CF4, and extends along those boundaries. Alternatively, each second projection portion 14b is located opposite to the boundary between associated color filters CF1 and CF3 and that between associated color filters CF2 and CF3, and extends along those boundaries.

Each of the third projection portions 14c is located opposite to the signal lines S2 and S3 provided as shown in FIG. 5, extends along the signal lines, and projects toward the counter-substrate CT. Also, each third projection portion 14c is located opposite to the boundary between associated color filters CF1 and CF3 and that between associated color filters CF2 and CF3, and extends along those boundaries. Alternatively, each third projection portion 14c is located opposite to the boundary between associated color filters CF1 and CF4 and that between associated color filters CF2 and CF4, and extends along those boundaries.

The second projection portions 14b arranged in the second direction Y are separated from each other in areas located opposite to the second extension portions SH2b. Both end portions of each of the second projection portions 14b are located opposite to associated second extension portions SH2b, respectively.

Similarly, the third projection portions 14c arranged in the second direction Y are separated from each other in the areas located opposite to the second extension portions SH2b. Both end portions of each of the third projection portions 14c are located opposite to associated second extension portions SH2b, respectively.

In addition to a plurality of first light-shielding portions SH1a, the first light-shielding layer SH1 includes a plurality of second light-shielding portions SH1b and a plurality of third light-shielding portions SH1c. The first light-shielding portions SH1a, the second light-shielding portions SH1b and the third light-shielding portions SH1c are formed continuously with each other, respectively. The second light-shielding portions SH1b are located above the second projection portions 14b, and the third light-shielding portions SH1c are located above the third projection portions 14c. The second and third light-shielding portions SH1b and SH1c are located on a conductive layer CL provided as shown in FIG. 7, and are electrically connected to the conductive layer CL. The second and third light-shielding portions SH1b and SH1c are formed of the same material as the first light-shielding portions SH1a.

By virtue of the above structure, in modification 1, it is possible to obtain the same advantage as in the above embodiment. Furthermore, it is possible to further restrict the occurrence of a color mixture between sub-pixels of different colors which are adjacent to each other in the first direction X.

Next, a liquid crystal display device DSP according to modification 2 of the above embodiment will be described.

FIG. 9 is a configuration view showing a unit pixel UPX1 in a liquid crystal display panel PNL in the liquid crystal display device DSP according to modification 2, and also showing first projection portions 14a, second projection portions 14b, third projection portions 14c, a first light-shielding layer SH1, a second light-shielding layer SH2 and color filters CF.

As shown in FIG. 9, the liquid crystal display panel PNL according to modification 2 is formed in the same manner as that according to modification 1, except that in the liquid crystal display panel PNL according to modification 2, second projection portions 14b arranged in the second direction Y are continuously formed; third projection portions 14c arranged in the second direction Y are continuously formed; second light-shielding portions SH1b arranged in the second direction Y are continuously formed; and third light-shielding portions SH1c arranged in the second direction Y are continuously formed.

Therefore, in modification 2 also, it is possible to obtain the same advantage as in the above embodiment.

Furthermore, in both modifications 1 and 2, with respect to the third projection portions 14c and the third light-shielding portions SH1c, it suffices that the liquid crystal display panel PNL is formed to include the third projection portions 14c and the third light-shielding portions SH1c as occasion demands.

Next, a liquid crystal display device DSP according to modification 3 of the above embodiment will be described.

A liquid crystal display panel PNL according to modification 3 is different from that in the above embodiment in the positional relationship between signal lines S and pixel electrodes PE. When the modification 3 and the embodiment are compared with each other with reference to FIG. 5, it is found that unlike the embodiment, in modification 3, pixel electrodes PEB and PEW are located between signal lines S2 and S3, not between signal lines S3 and S4.

Also, third extension portions SH2c are located opposite to a signal line S2. Also, fourth extension portions SH2d are located opposite to two signal lines S including a signal line S1. Alternatively, the fourth extension portions SH2d are located opposite to signal lines S3 and S4.

It should be noted that the liquid crystal display panel PNL according to modification 3 may further comprise second projection portions 14b, third projection portions 14c, second light-shielding portions SH1b and third light-shielding portions SH1c provided as shown FIGS. 8 and 9. In this case, the second projection portions 14b and the second light-shielding portions SH1b are located opposite to the signal line S2, and extend along the signal line S2. The third projection portions 14c and the third light-shielding portions SH1c are located opposite to the boundary between two signal lines including the signal line S1, and extend along the boundary. Alternatively, the third projection portions 14c and the third light-shielding portions SH1c are located opposite to the boundary between the signal lines S3 and S4, and extend along the boundary.

By virtue of the above structure, in modification 3 also, it is possible to obtain the same advantage as in the above embodiment.

Next, a liquid crystal display device DSP according to modification 4 of the above embodiment will be described.

Figure 10:
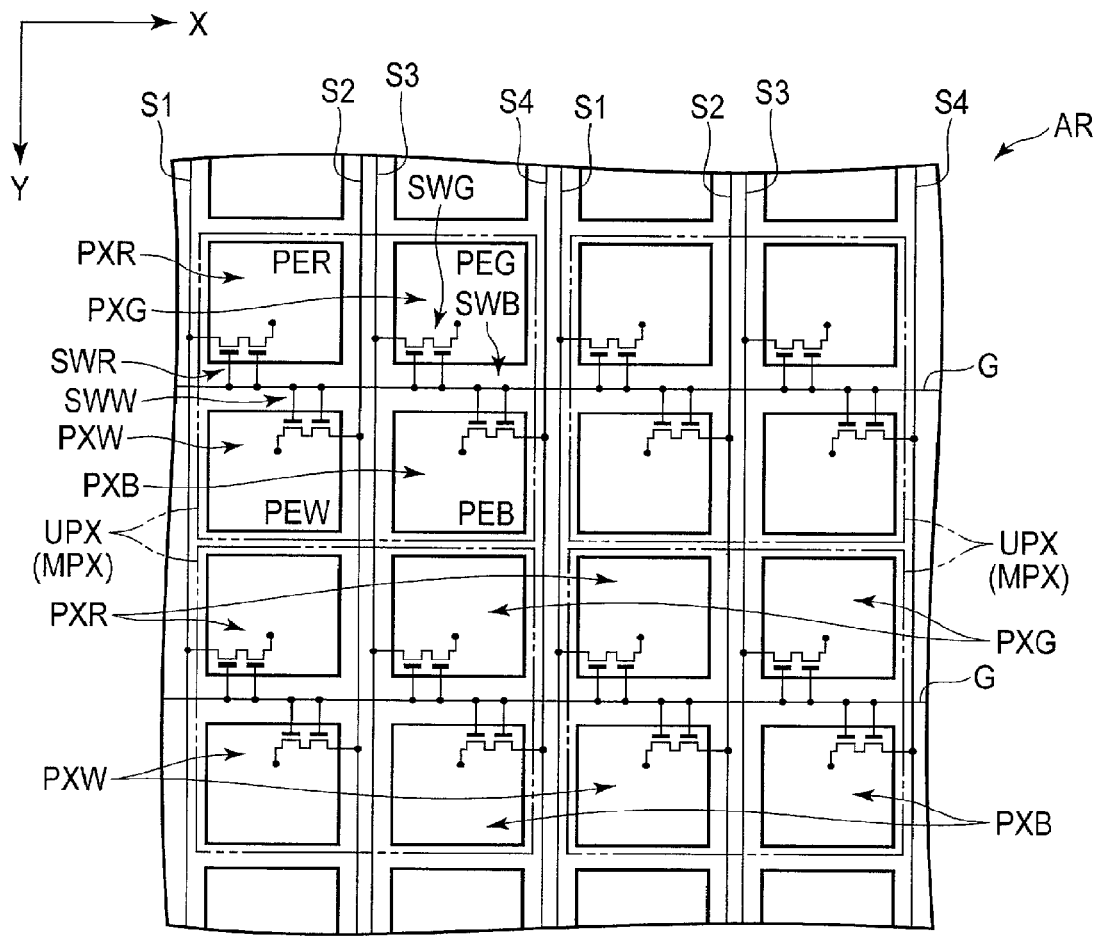
FIG. 10 is a configuration view showing 4 unit pixels in a liquid crystal display panel of a liquid crystal display device according to modification 4 of the above embodiment.
Figure 12:
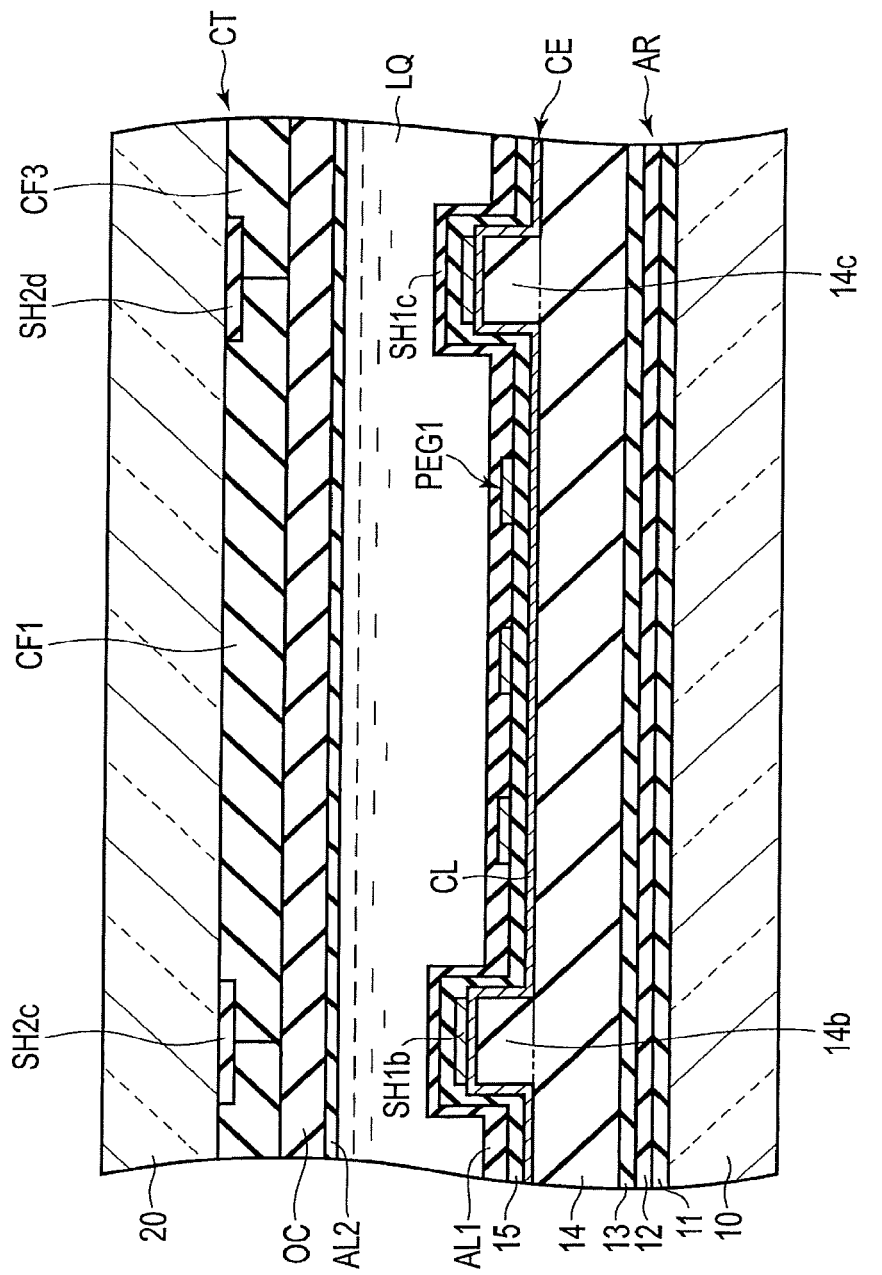
FIG. 12 is a configuration view showing the second projection portion 14*b* and the third projection portion 14*c*.

FIG. 10 is a configuration view showing 4 unit pixels UPX in a liquid crystal display panel PNL of the liquid crystal display device DSP according to modification 4.

As shown in FIG. 10, the liquid crystal display panel PNL includes a plurality of unit pixels UPX arranged in a matrix. Each of the unit pixels UPX is made up of a single main pixel MPX. The liquid crystal display panel PNL includes signal lines S1 to S4 and scanning lines G. The signal lines S1 to S4 are each shared among unit pixels UPX arranged in the second direction Y. The scanning lines G are each shared among unit pixels UPX arranged in the first direction X.

Each unit pixel UPX is made up of four adjacent sub-pixels, i.e., a sub-pixel PXR of the above second color, a sub-pixel PXW of the above fourth color, a sub-pixel PXG of the above first color, and a sub-pixel PXB of the above third color. The sub-pixel PXR includes a switching element SWR electrically connected to the signal line S1 and a pixel electrode PER electrically connected to the switching element SWR. The sub-pixel PXW includes a switching element SWW electrically connected to the signal line S2 and a pixel electrode PEW electrically connected to the switching element SWW. The sub-pixel PXG includes a switching element SWG electrically connected to the signal line S3 and a pixel electrode PEG electrically connected to the switching element SWG. The sub-pixel PXB includes a switching element SWB electrically connected to the signal line S4 and a pixel electrode PEB electrically connected to the switching element SWB.

The pixel electrodes PER and PEW are located between the signal lines S1 and S2. The pixel electrodes PEG and PEB are located between the signal lines S3 and S4. The scanning lines G are each located between pixel electrodes PER and PEG of unit pixels UPX arranged in the first direction X and pixel electrodes PEW and PEB of those unit pixels UPX.

It should be noted that there can be a case where between adjacent unit pixels UPX in the second direction Y, no line is provided, for example, no scanning line G is provided.

FIG. 11 is a configuration view showing unit pixels UPX provided as shown in FIG. 10, and also showing the first light-shielding layer SH1, the second light-shielding layer SH2 and color filters CF.

As shown in FIG. 11, each of the first projection portions 14a and each of the first extension portions SH2a are located opposite to the boundary between associated unit pixels UPX adjacent to each other in the second direction Y, and extend along the boundary. Alternately, each first projection portion 14a and each first extension portion SH2a are located opposite to the boundary between color filters CF of associated unit pixels UPX arranged in the first direction X and color filters CF of associated unit pixels UPX adjacent to the above unit pixels UPX in the second direction Y and arranged in the first direction X, and extend along the boundary.

The second extension portions SH2b are located opposite to the scanning lines G provided as shown in FIG. 10, and extend along the scanning lines G. Also, each of the second extension portions SH2b is located opposite to the boundary between color filters CF1 and CF2 of associated unit pixels UPX arranged in the first direction X and color filters CF3 and CF4 of those unit pixels UPX, and extend along the boundary.

Each of the fourth extension portions SH2d is located opposite to two signal lines S provided as shown in FIG. 10, and extends along those signal line S.

In modification 4, the width Wa is less than the width Wb (Wa<Wb). Also, the width Wa is less than the width Wd (Wa<Wd).

By virtue of the above structure, in modification 4 also, it is possible to obtain the same advantage as in the above embodiment. It should be noted that in modification 4, the liquid crystal display panel PNL may further include the above third projection portions 14c and third light-shielding portions SH1c. Thereby, it is possible to further restrict occurrence of a color mixture between sub-pixels of different colors which are arranged adjacent to each other in the first direction X.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the liquid crystal display panel PNL may be formed without the first light-shielding layer SH1. The liquid crystal display panel PNL has only to include projection portions such as the first projection portions 14a in order to restrict occurrence of a color mixture.

For example, the liquid crystal display panel PNL according to the above embodiment has a structure adapted for a FFS mode which is a display mode; however, it may have a structure adapted for another display mode. For example, the liquid crystal display panel PNL may have a structure adapted for an in-plane switching (IPS) mode such as the FFS mode, which primarily utilizes a lateral electric field substantially parallel to a main surface of the substrate. In a display mode utilizing a lateral electric field, it is possible to apply a structure including, for example, an array substrate AR provided with pixel electrodes PE and a common electrode CE.

Alternatively, the liquid crystal display panel PNL may have a structure in which the pixel electrodes PE are formed in the array substrate AR, and at least part of the common electrode CE is formed in the counter-substrate CT. Furthermore, it is possible to switch the alignment of liquid crystal molecules of the liquid crystal layer LQ mainly by using an electric field generated between the pixel electrodes PE and the common electrode CE. The electric field generated between the pixel electrodes PE and the common electrode CE is an electric field slightly inclined with respect to the main surface of the substrate (or a lateral electric field substantially parallel to the main surface of the substrate). In this case, the pixel electrodes PE and the first light-shielding layer SH1 can be formed of the same metallic material. It should be noted that the main surface of the substrate is a surface parallel to an X-Y plane defined in the first direction X and the second direction Y.

Alternatively, the liquid crystal display panel PNL may have a structure adapted for a mode primarily utilizing a vertical electric field substantially perpendicular to the main surface of the substrate, such as a twisted nematic (TN) mode, an optically compensated bend (OCB) mode or a vertically aligned (VA) mode. In the display mode utilizing the vertical electric field, for example, it is possible to apply a structure provided with an array substrate AR including pixel electrodes PE and a counter-substrate CT including a common electrode CE.

The above embodiment is not limited to the above liquid crystal display panel PNL or liquid crystal display device DSP; that is, it can be applied to various liquid crystal display panels and devices. Needless to say, the above embodiment can be applied to middle or small display devices and large display devices with no specific limitation.

What is claimed is:

1. A liquid crystal display panel comprising:
a first substrate including an organic insulating film and first and second pixel electrodes formed above the organic insulating film and adjacent to each other;
a second substrate located opposite to the first and second pixel electrodes, and spaced from the first substrate;
a liquid crystal layer held between the first and second substrates;
a first color filter located opposite to the first pixel electrode;
a second color filter located opposite to the second pixel electrode and having a color different from that of the first color filter; and
a third color filter having a color different from those of the first and second color filters,
wherein
the first substrate further includes: a third pixel electrode which is formed above the organic insulating film, and which is adjacent to both the first pixel electrode and the second pixel electrode in a first direction perpendicular to a second direction in which the first and second pixel electrodes are adjacent to each other; and a first signal line, a second signal line, and a third signal line which are formed below the organic insulating film, extend in the second direction, and are spaced from each other in the first direction,
the third color filter is located opposite to the third pixel electrode,
the first and second pixel electrodes are both located between the first and second signal lines,
the third signal line is located between the second signal line and the third pixel electrode, and
the organic insulating film includes a first projection portion which is located opposite to a boundary between the first and second color filters, extends along the boundary, and projects toward the second substrate, and a second projection portion which is located opposite to the first signal line, extends along the first signal line, and projects toward the second substrate.

2. The liquid crystal display panel of claim 1, with respect to a thickness of the liquid crystal layer, a thickness of a portion of the liquid crystal layer which is located opposite to the first projection portion is smaller than that of each of portions of the liquid crystal layer which are located opposite to the first pixel electrode and the second pixel electrodes, respectively.

3. The liquid crystal display panel of claim 1, wherein
the first substrate further includes a plurality of scanning lines which are formed below the organic insulating film, which extend in a first direction perpendicular to a second direction in which the first pixel electrode and the second pixel electrode are adjacent to each other, and which are arranged and spaced from each other in the second direction, and
the first projection portion is located at a position not overlapping the scanning lines as seen in plan view.

4. The liquid crystal display panel of claim 1, wherein
the organic insulating film further includes a third projection portion located opposite to a boundary between the second and third signal lines, extending along the boundary, and projecting toward the second substrate.

5. The liquid crystal display panel of claim 1, wherein
the first substrate further includes a first light-shielding layer which is formed above the first projection portion.

6. The liquid crystal display panel of claim 5, wherein
the first light-shielding layer is electrically conductive.

7. The liquid crystal display panel of claim 5, wherein
the first substrate further includes a common electrode formed on the organic insulating film and an interlayer insulating film formed on the organic insulating film and the common electrode,
the first pixel electrode and the second pixel electrode are formed on the interlayer insulating film, and located opposite to the common electrode, and
the first light-shielding layer has a light-insulating property, and is formed of metal to form part of the common electrode.

8. The liquid crystal display panel of claim 1, wherein
the second substrate includes a second light-shielding layer which comprises: a first extension portion which extends in a first direction perpendicular to a second direction in which the first pixel electrode and the second pixel electrode are adjacent, and which is located opposite to the first projection portion; and a pair of second extension portions which extend in the first direction, and are spaced from each other in the second direction, with the first extension portion interposed between the second extension portions, and
a width of the first extension portion in the second direction is smaller than that of each of the second extension portions in the second direction.

9. The liquid crystal display panel of claim 1, wherein
in an arbitrary display drive period, the first pixel electrode is supplied with a first image signal, and the second pixel electrode is supplied with a second image signal whose polarity is the same as that of the first image signal.

10. A liquid crystal display panel comprising:
a first substrate including an organic insulating film and first and second pixel electrodes formed above the organic insulating film and adjacent to each other;
a second substrate located opposite to the first and second pixel electrodes, and spaced from the first substrate;
a liquid crystal layer held between the first and second substrates;
a first color filter located opposite to the first pixel electrode;
a second color filter located opposite to the second pixel electrode and having a color different from that of the first color filter; and
a third color filter having a color different from those of the first and second color filters,
wherein the first substrate further includes: a third pixel electrode which is formed above the organic insulating film, and which is adjacent to both the first pixel electrode and the second pixel electrode in a first direction perpendicular to a second direction in which the first and second pixel electrodes are adjacent to each other; and a first signal line, a second signal line, and a third signal line which are formed below the organic insulating film, extend in the second direction, and are spaced from each other in the first direction, the third color filter is located opposite to the third pixel electrode, the first and second pixel electrodes are both located between the first and second signal lines, the third pixel electrode is located between the second and third signal lines, and the organic insulating film includes a first projection portion located opposite to a boundary between the first and second color filters, extending along the boundary, and projecting toward the second substrate, and a second projection portion located opposite to the second signal line, extending along the second signal line, and projecting toward the second substrate.

* * * * *